United States Patent Office 3,700,640
Patented Oct. 24, 1972

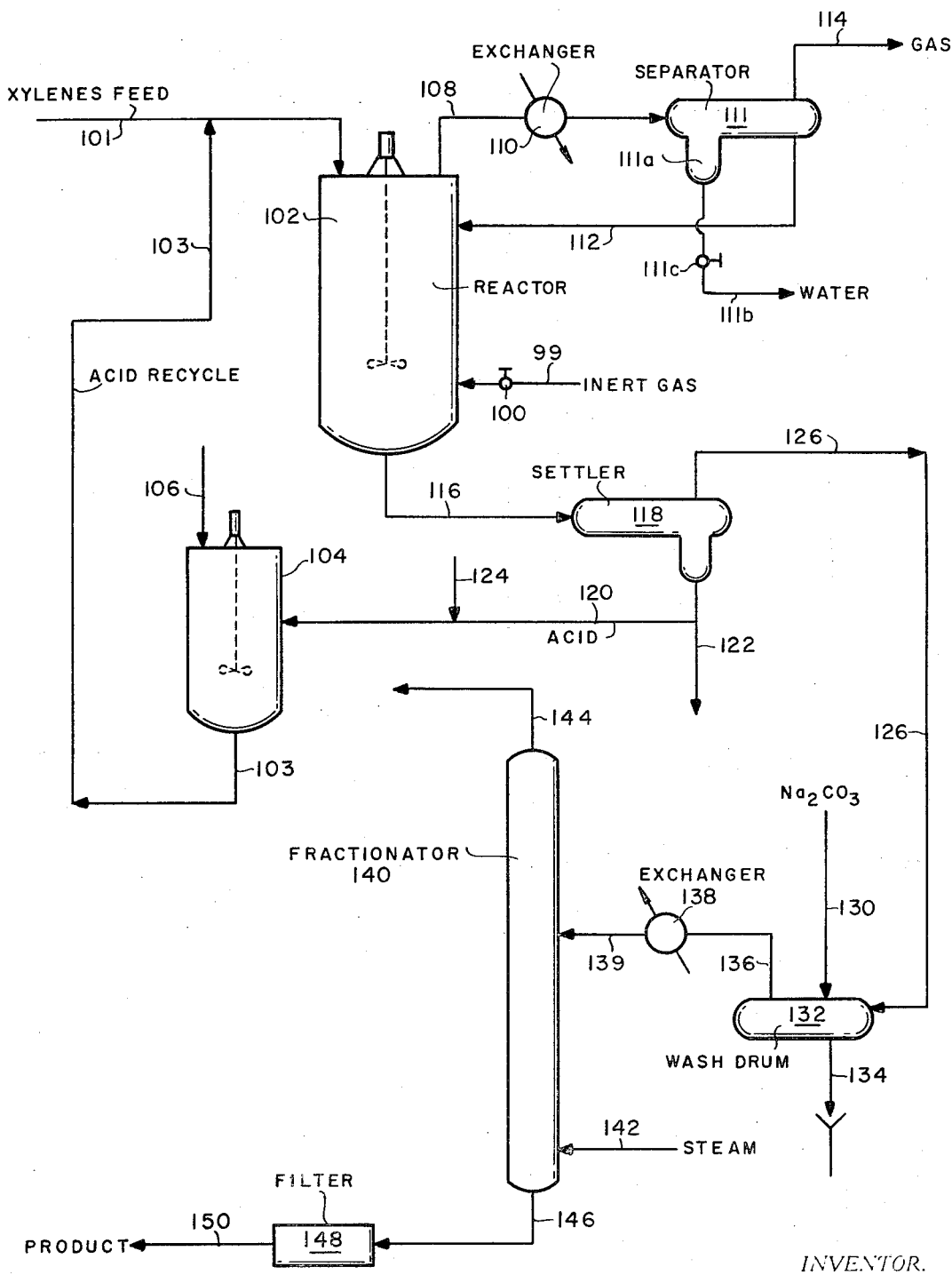

3,700,640
MANUFACTURE OF AROMATIC
FORMALDEHYDE RESINS
Harry E. Cier, Baytown, Tex., assignor to Esso
Research and Engineering Company
Continuation-in-part of abandoned application Ser. No.
757,046, Sept. 3, 1968. This application Dec. 9, 1970,
Ser. No. 96,571
Int. Cl. C08g 7/00
U.S. Cl. 260—67 A
6 Claims

ABSTRACT OF THE DISCLOSURE

Aromatic-formaldehyde resins of controlled oxygen content and viscosity are produced by reacting xylenes and formaldehyde under selected conditions of $H_2SO_4$ catalyst strength, acid:oil ratio, oil residence time, and selected temperatures.

CROSS REFERENCE TO RELATED APPLICATION

This application is a continuation-in-part of Ser. No. 757,046, filed Sept. 3, 1968, for Harry E. Cier, entitled "Manufacture of Aromatic Formaldehyde Resins," now abandoned.

BACKGROUND OF THE INVENTION

(1) Field of the invention

The present invention is directed to production of aromatic-formaldehyde resins of selected oxygen content. More particularly, the invention is concerned with the production of high oxygen content resins of selected viscosity. In its more specific aspects, the invention is directed to controlling the aromatic-formaldehyde condensation reaction to produce products of selected oxygen content, viscosity, and molecular weight.

(2) Prior art

It is well known to produce aromatic-formaldehyde resins by condensation of an aromatic hydrocarbon such as xylene with formaldehyde or paraformaldehyde in the presence of an acid catalyst. It is also known that products of high oxygen content may be produced if the products from such prior art processes are distilled to separate light and heavy resinous products. This requires distillation under reduced pressure in the presence of basic material to avoid thermal or other decomposition of the desired product. Specific prior art considered with respect to this invention includes the following listed U.S. patent issued to Heinrich et al. and the art cited thereagainst: U.S. 3,372,147.

SUMMARY OF THE INVENTION

The present invention may be briefly described and summarized as involving the condensation of an aromatic hydrocarbon such as the methyl-substituted benzenes preferably m-xylene with formaldehyde under conditions including a temperature within the range of 200° to 207° F., a sulfuric acid catalyst having a strength of 36% to 42.5% $H_2SO_4$, an acid:oil ratio in the reactor within the range of 1 to 6 and an oil residence time from about 0.25 to about 5 hours to produce products having undistilled oxygen contents of about 9 to about 15.5, viscosities, SSU at 210° F., from about 100 to about 5000, and molecular weights ranging from about 240 to about 5000.

BRIEF DESCRIPTION OF THE DRAWING

The present invention will be further described by reference to the drawing in which the sole figure is a flow diagram of a preferred mode.

DESCRIPTION OF THE PREFERRED MODES AND EMBODIMENTS WITH REFERENCE TO THE DRAWING

The present invention can best be understood by reference to the drawing, wherein is shown a schematic flow diagram of the process of the present invention.

Using a refinery xylene stream as an exemplary feedstock, the process carried out as shown in the figure is as follows:

A mixed xylene stream (principally m-xylene and ethylbenzene) is introduced by way of line 101 into the stirred reactor 102, along with acid recycle which is introduced by way of line 103. A small stream of inert gas such as nitrogen is introduced to reactor 102 by line 99 controlled by valve 100. Paraformaldehyde is added into the acid recycle stream carried by line 103 and is admixed therewith in pot 104, after introduction through line 106. Thus, in the reactor 102, the mixed xylenes stream is contacted with paraformaldehyde dissolved in the acid for a time period sufficient to obtain the condensation product, and under conditions of acid-to-oil ratio, etc., chosen to obtain the desired combination of oxygen content, molecular weight, and viscosity. An overhead product is removed by way of line 108, condensed in heat exchanger 110, and recycled by way of line 112 into the reactor, an off-gas stream being passed by way of line 114 to a flare (not shown). The recycled stream in line 112 is comprised of the condensed aromatic hydrocarbons from reactor 102 (metaxylene, paraxylene, orthoxylene and ethylbenzene). The separation is carried out in separator drum 111 from whence water accumulated in leg 111a may be discarded by line 111b controlled by valve 111c or sent to recovery faciilties for formaldehyde such as a distillation column not shown. The inert gas introduced into reactor 102 by line 99 controlled by valve 100 assists in removing water to maintain proper acid strength. A liquid product is withdrawn by way of line 116 from the bottom of reactor 102, and is pased into a settler 118, wherein the acid phase separates from an oil phase, and the acid is recycled by way of line 120. Suitable means for reconstituting the acid may be provided, such as withdrawing a portion of the acid by way of line 122 and adding fresh acid by way of line 124.

The oil phase is withdrawn overhead from the settler 118 by way of line 126, and is scrubbed with sodium carbonate introduced by way of line 130 into the wash drum 132 so as to neutralize any residual acid carried out by the oil phase. An aqueous spent sodium carbonate phase is discharged by way of line 134.

A neutralized oil phase is removed by way of line 136, heated in exchanger 138 and charged into a fractionating tower 140 by way of line 139. In the tower 140, a steam distillation process is carried out by means of steam introduced into the bottom of the tower by way of line 142, and an overhead product is obtained by way of line 144 which is essentially unreacted xylene and ethylbenzene.

A product stream is obtained by way of bottoms stream 146, is passed over the filter 148 and recovered by way of line 150 as the desired resin product.

Thus, from the general flow scheme shown in the attached drawing, it is seen that a continuous process is carried out whereby a resin product is obtained. The present invention relates to the particular conditions to be employed in the reaction zone so as to obtain a product of relatively constant quality having the desired combination of the several properties. These conditions, which are to be selectively employed, are shown in the following table wherein selected conditions are provided for producing a varnish resin, a lacquer grade resin or an adhesive resin.

TABLE I

|  | Varnish resin | Lacquer grade | Adhesive resin |
|---|---|---|---|
| Reactor pressure, p.s.i.g. | 0-15 | 0-15 | 0-15 |
| Reactor temperature: °F. | 200-205 | 200-250 | 202-207 |
| Preferred | 202-203 | 202-203 | 203-204 |
| Feed charge, weight ratio: | | | |
| Xylenes to PF | 2.2-2.7 | 2.5-3.0 | 2.6-3.4 |
| Xylene, preferred | 2.3-2.4 | 2.6-2.8 | 3.0-3.1 |
| $H_2SO_4$ acid catalyst: | | | |
| Strength, weight percent acid | 40 ± 2.5 | 40 ± 2.0 | 39 ± 4.0 |
| Strength, preferred | 40-42 | 38-40 | 36-38 |
| Acid:oil ratio in: | | | |
| Reactor, volume basis | 1.0-3.0 | 1.5-4.0 | 2.0-8.0 |
| Reactor, preferred | 1.0-1.25 | 2.0-3.0 | 4.0-6.0 |
| Oil residence time: | | | |
| Hours | 2.5-5.0 | 0.25-3.5 | 0.10-0.50 |
| preferred | 3.0-4.0 | 0.5-2.0 | 0.15-0.25 |
| Oxygen content of product | 9.0-10.0 | 11.5-12.5 | 13.5-15.5 |
| Viscosity SSU at 210° F | 2,000-5,000 | 1,500-2,500 | 100-600 |
| M.W. | 600-1,000 | 450-750 | 300-600 |
| Hydroxyl | 0.5-2.0 | 0.75-2.5 | 1.0-4.0 |

From the foregoing Table I and from the disclosures in column 1, it will be clear that the overall ranges of conditions contemplated in the present invention are:

| | |
|---|---|
| Reactor pressure, p.s.i.g. | 0-15 |
| Reaction temperature, °F. | 200-207 |
| Xylenes:Paraformaldehyde rates | 2.2-3.4 |
| $H_2SO_4$ catalyst | 36-42.5 |
| Acid:Oil volume ratio in the reactor | 1-6 |
| Oil residence time, hours | 0.10-5.0— |

The foregoing conditions and product quality are those required and obtainable under continuous operations as set out in the drawing. These runs may be compared with conditions and product characteristics obtainable in batch operations as shown in Table II.

TABLE II

|  | Varnish resin | Lacquer grade | Adhesive resin |
|---|---|---|---|
| Relative charges, gm: | | | |
| Xylenes | 1,000 | 1,000 | 1,000 |
| Paraformaldehyde [1] | 465 | 465 | 465 |
| Sulfuric acid | 370 | 440 | 295 |
| Acid strength percent: | | | |
| Start of run | 60 | 50 | 50 |
| End of run | 42.5 | 36.3 | 31.2 |
| Reaction temperature, °F.: | | | |
| Start of run | 207 | 204 | 203 |
| End of run | 225 | 215 | 208 |
| Resin inspections: | | | |
| Oxygen weight percent | 9.6 | 12.2 | 14.1 |
| Viscosity SSU at 210° F | 28,000 | 2,630 | 380 |

[1] 9% water.

NOTE.—Acid catalyst added in increments at 15-minute intervals over a 3-4 hour addition period. Reaction continued for a total reaction time of 5-6 hours.

It will be seen that comparable oxygen contents are obtained but the viscosities and therefore the molecular weights are quite different. Also it is to be noted that acid strengths are much higher requiring a greater expense for reconcentration, even under comparable temperature conditions than with the continuous operation. Batch operations also require longer reaction times than does the present invention.

Thus, the present invention provides an improved continuous process under selected critical conditions which allows the production of products which may be used as varnishes, lacquers, and adhesives depending on the conditions selected with minimum effort and equipment. The invention is therefore quite important and useful.

While the invention has been described and illustrated with respect to xylene, other mono-aryl polymethyl-substituted aromatic hydrocarbons may be used such as the three xylene isomers, but preferably m-xylene, and higher boiling methyl-substituted aromatic hydrocarbons such as, but not limited to, the trimethyl and tetramethylbenzenes as well as the higher polymethylated compounds of the naphthalene series.

The formaldehyde may be used as such or preferably in the form of paraformaldehyde. However, various formalins (from 37-55 wt. percent aqueous solutions of formaldehyde) trioxane, and the like may be used.

The nature and objects of the present invention having been fully described and illustrated and the best mode contemplated set forth, what I wish to claim as new and useful and secure by Letters Patent is:

1. A continuous method of producing a xylene-formaldehyde resin of selected oxygen content from about 9 to about 15.5 and a selected viscosity, SSU at 210° F., within the range from about 100 to about 5000 which comprises:
    (1) reacting xylene and paraformaldehyde in a reactor under the following conditions:
        (a) a reaction temperature within the range from 200° to 207° F.;
        (b) a xylenes: paraformaldehyde ratio within the range of 2.2 to 3.0;
        (c) in the presence of a sulfuric acid catalyst having a strength maintained within the range of 36 to 42.5% by weight $H_2SO_4$;
        (d) an acid: oil volume ratio in the reactor within the range from 1 to 6; and
        (e) an oil residence time in hours from 0.10 to 5;
    (2) removing from the upper portion of the reactor an overhead product and condensing same to form a water layer containing formaldehyde, an intermediate xylene layer and a gas phase, discharging the water layer and gas phase, and recycling the xylene layer to the upper portion of the reactor; and
    (3) recovering said resin from the bottom of said reactor and distilling said resin to remove unreacted xylene.

2. A method in accordance with claim 1 in which the resin is varnish grade, has an oxygen content of 9-10, a viscosity, SSU at 210° F., from 2000-5000 and is obtained by reacting paraformaldehyde and xylene in a reactor under the following conditions:
    (a) a reaction temperature within the range of 200° to 205° F.;
    (b) a xylenes: paraformaldehyde ratio within the range of 2.2 to 2.7;
    (c) in the presence of a sulfuric acid catalyst having a strength maintained within the range of 37.5% to 42.5% by weight $H_2SO_4$;
    (d) an acid:oil volume ratio in the reactor from 1 to 3;
    (e) an oil residence time in hours from 2.5 to 5.0; and
    (f) recovering said resin by distillation to remove unreacted xylene.

3. A method in accordance with claim 1 in which the resin is lacquer grade, has an oxygen content of 11.5-12.5, a viscosity, SSU at 210° F., from 1500-2500 and is obtained by reacting paraformaldehyde and xylene in a reactor under the following conditions:
    (a) a reaction temperature within the range of 200° to 205° F.;
    (b) a xylenes:paraformaldehyde ratio within the range of 2.5 to 3.0;
    (c) in the presence of a sulfuric acid catalyst having a strength maintained within the range of 38% to 40% by weight $H_2SO_4$;
    (d) an acid:oil volume ratio in the reactor from 1.5 to 4.0;
    (e) an oil residence time in hours from 0.25 to 3.5; and
    (f) recovering said resin by distillation to remove unreacted xylene.

4. A method in accordance with claim 1 in which the resin is adhesive resin, has an oxygen content of 13.5-15.5, a viscosity, SSU at 210° F., from 100-600 and is obtained by reacting paraformaldehyde and xylene in a reactor under the following conditions:
    (a) a reaction temperature within the range of 202° to 207° F.;
    (b) a xylenes:paraformaldehyde ratio within the range of 2.6 to 3.4;

(c) in the presence of a sulfuric acid catalyst having a strength maintained within the range of 35% to 43% by weight $H_2SO_4$;

(d) an acid:oil volume ratio in the reactor from 4 to 6; and (e) an oil residence time in hours from 0.10 to 0.50; and (f) recovering said resin by distillation to remove unreacted xylene.

5. A continuous method of producing a methyl substituted aromatic hydrocarbon-formaldehyde resin of selected oxygen content from about 9 to about 15.5 a selected viscosity, SSU at 210° F., within the range from about 100 to about 5000 which comprises:

(1) reacting a poly-methyl substituted aromatic hydrocarbon selected from the group consisting of the trimethyl, tetramethyl benzenes and the higher polymethylated compounds of the naphthalene series and paraformaldehyde in a vertical reactor under the following conditions:

(a) a reaction temperature within the range from 200° to 207° F.;

(b) said methyl substituted aromatic hydrocarbon: paraformaldehyde ratio being within the range of 2.2 to 3.0;

(c) in the presence of a sulfuric acid catalyst having a strength maintained in the reactor within the range of 36 to 42.5% by weight $H_2SO_4$;

(d) an acid: oil volume ratio in the reactor within the range from 1 to 6; and (e) an oil residence time in hours from 0.10 to 5;

(2) removing from the upper portion of said reactor an overhead product and condensing same to form a water layer, a methyl substituted aromatic hydrocarbon layer and a gas phase, discharging the water layer and gas phase and recycling the aromatic hydrocarbon layer to the upper portion of the reactor; and (3) recovering said resin from the bottom of said reactor and distilling said resin to remove unreacted methyl substituted aromatic hydrocarbon.

6. A method in accordance with claim 5 in which the acid strength is maintained by introducing into the lower portion of the reactor an inert gas to remove water.

References Cited

UNITED STATES PATENTS

| | | | |
|---|---|---|---|
| 3,372,147 | 3/1968 | Heinrich et al. | 260—67 A |
| 3,378,466 | 4/1968 | Coltharp et al. | 260—67 A |
| 3,407,178 | 10/1968 | Heinrich | 260—67 A |
| 3,423,368 | 1/1969 | Cier | 260—67 A |

WILLIAM H. SHORT, Primary Examiner

L. M. PHYNES, Assistant Examiner